March 9, 1965 T. R. SANTELLI 3,172,929
METHOD OF FORMING A HOLLOW PLASTIC ARTICLE
Original Filed Oct. 17, 1961 3 Sheets-Sheet 1
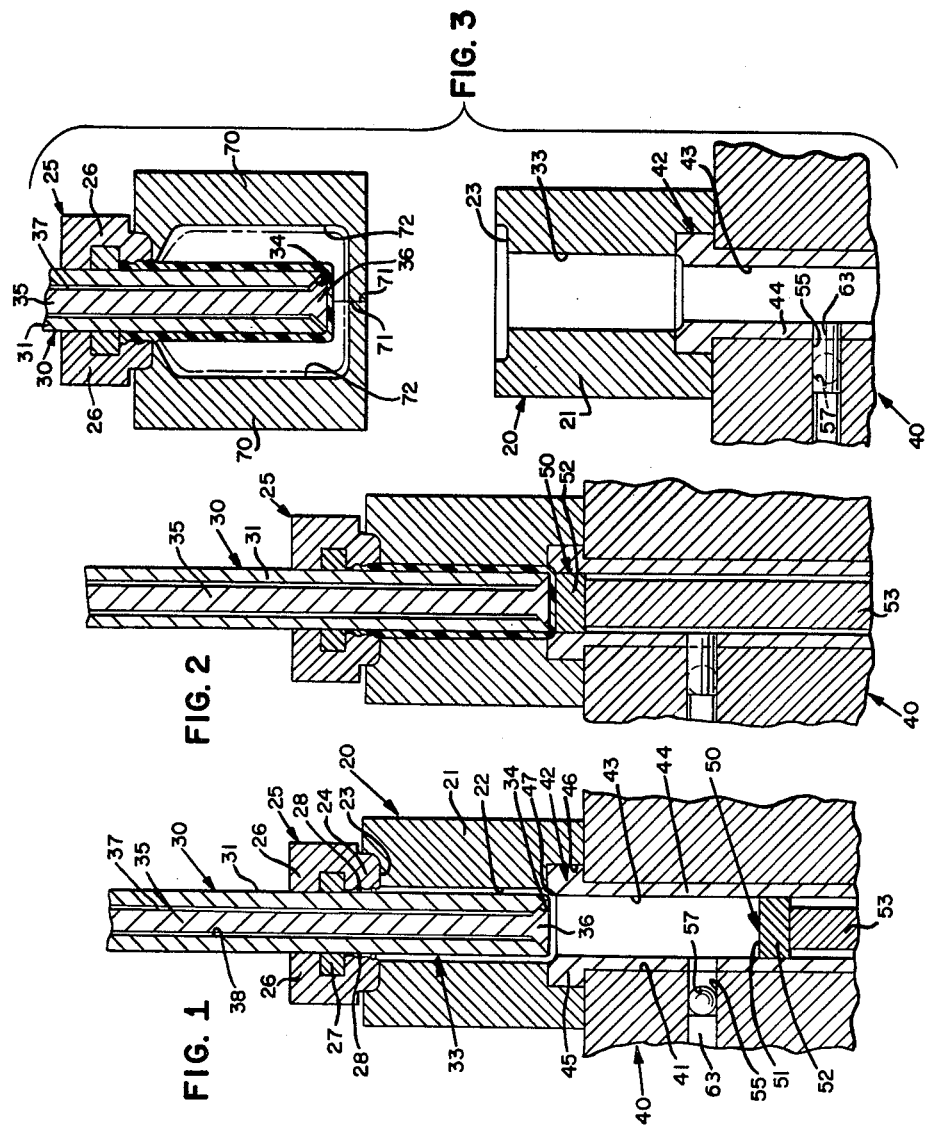
INVENTOR.
THOMAS R. SANTELLI
BY Spencer L. Blaylock, Jr.
W. A. Schaich
ATTORNEYS

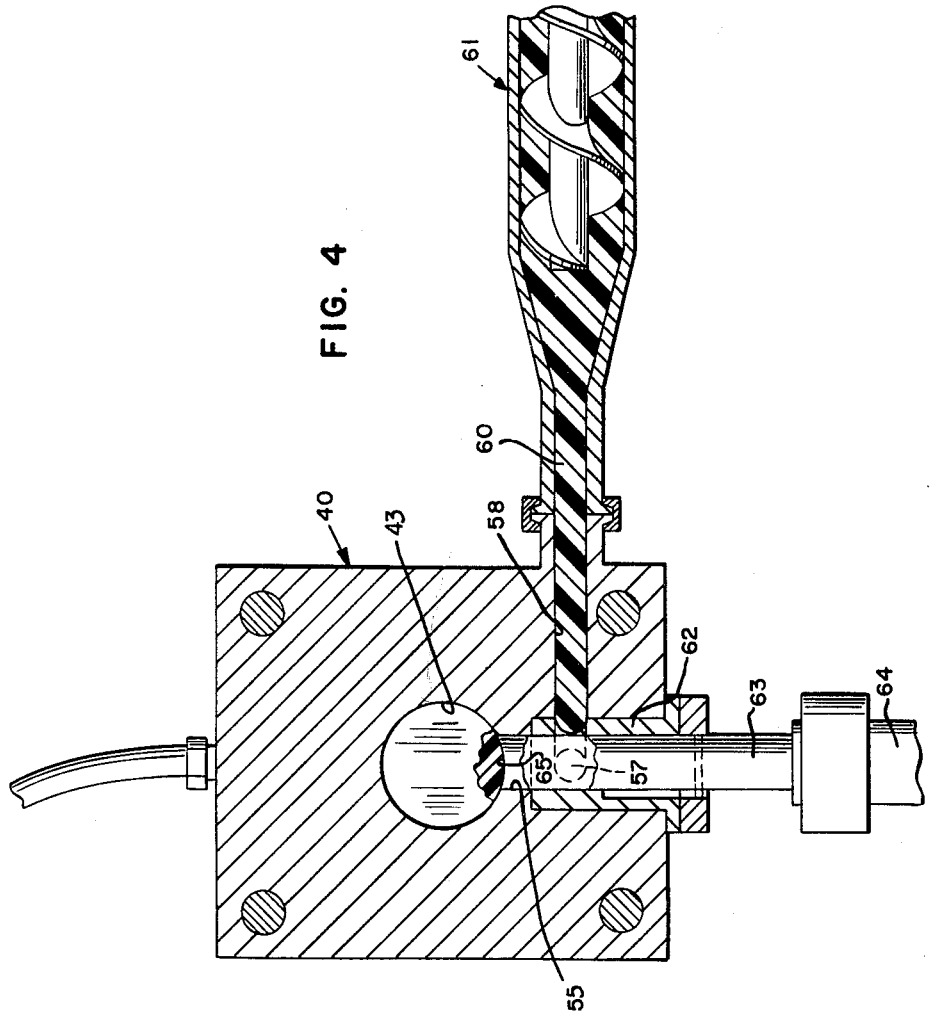

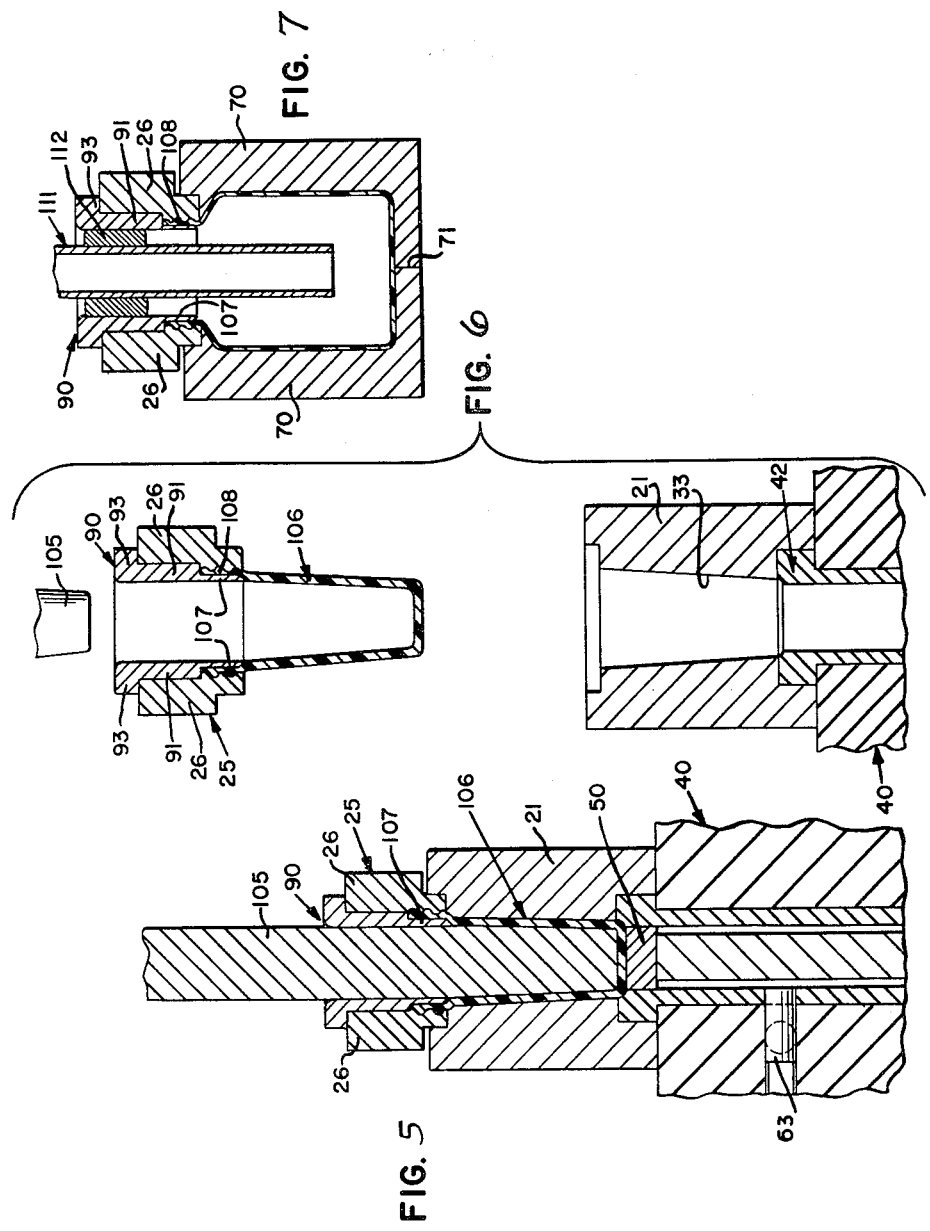

United States Patent Office 3,172,929
Patented Mar. 9, 1965

3,172,929
METHOD OF FORMING A HOLLOW
PLASTIC ARTICLE
Thomas R. Santelli, Sylvania, Ohio, assignor to Owens-Illinois Glass Company, a corporation of Ohio
Continuation of application Ser. No. 146,686, Oct. 17, 1961. This application Feb. 24, 1964, Ser. No. 346,877
6 Claims. (Cl. 264—97)

The present invention relates to method of making a plastic article. More particularly, this invention proposes a method wherein an initially injection molded blank or preform is subsequently enclosed by and blown in a partible blow mold. This application is a continuation of my earlier filed application, Serial No. 146,686, filed October 17, 1961, now abandoned.

In the blow molding of plastic articles, such as containers or the like, the present commercial practice basically involves the extrusion of a tubular blank of heat-softened plastic material, closing a sectional blow mold on the tube to pinch the tube shut at one end, and finally injecting air under pressure through the other, still open end of the tube to inflate the pinched tube to the configuration of the blow mold. Several variants of this process are utilized, such as extuding the tube as a freely pendant length and blowing the entire container in the blow mold; closing "clam shell" molds mounted in series on a turntable on successive portions of a horizontally extruded tube and injecting air through a needle puncturing the tube length interiorly of the mold; or injecting a neck portion of the container followed by the extrusion of a tube integral with the neck, pinching the tube shut in a blow mold enclosing only the tube, and then blowing the tube by air introduced through the earlier injected neck. In any event, closure of the tube by the blow mold necessarily produces a waste or "tail" portion which must be removed subsequently from the blown article and, where the neck or "finish" of the container is also blown, "neck flash" or neck-joined waste portions are also produced for necessary later removal.

To eliminate such waste portions, the utilization of injection molded preforms or blanks has been proposed. Such processes generally require re-heating of the injection molded blanks before blowing, thus substantially slowing the production cycle. Even more seriously, the formation of the blank by conventional injection molding procedures produces a blank and a finished article of undesirable character, due to the introduction of plastic material into the blank mold through an injection passage and a passage-to-mold orifice of greatly reduced cross-sectional dimension relative to the other dimensions of the mold. The utilization of such small openings is necessary in order to rupture the injection molded blank from the source of plasticized material, usually from a sprue or runner joined to the injection mold cavity by the reduced orifice. The thermal variations encountered by the more rapid solidification, in fact "super-chilling," of the material at the orifice induce into the injection molded preform built-in-stress-concentration points, resulting in stress cracking, warpage and structural weaknesses concentrated at the sprue-to-mold juncture area. Thus, there is necessarily present in any blank produced by conventional injection molding procedures a weakened section which normally ruptures during subsequent blowing of the blank or which, even if not ruptured, results in a weakened portion of the final blown article.

The present invention now proposes the formation of a blown article by a process eliminating the inevitable waste portions of the various tube-blowing processes and also eliminating the inherent weakening of the blank and/or the article. Thus, an improved article free of waste and free of structural weaknesses, and possessing the full isotropic properties of the plastic material is obtained for the first time from an injection molded preform.

More particularly, the present invention proposes the formation of a waste-free injection molded and subsequently blown blank by the formation of the blank in an injection mold wherein the material to be injection molded is introduced into the mold cavity through an opening of appreciable size and preferably corresponding substantially to one dimension, usually the closed bottom dimension, of the injection molded blank. By thus eliminating a subsequently fractured connection through a substantially reduced orifice to the source of plastic material, the present invention eliminates the inevitable thermally weakened portion of previously injection molded blanks. By utilizing the blow head as a portion of the injection molding apparatus, it is possible to immediately blow the injection molded blank without the necessity of re-heating. Alternatively, by the immediate transfer of the injection molded blank to a blow molding station, a separate blow head may be inserted into the blank and utilized for blowing the blank to its final configuration without re-heating.

The resultant article possesses the full isotropic properties of the plastic material and is free of those thermal instabilities and inherent stress concentration points encountered in the use of previously proposed processes utilizing reduced injection orifices and forming subsequently ruptured joining portions of reduced cross-sectional dimension relative to the blank and/or the final article.

It is, therefore, an important object of the present invention to provide a novel method of making a blown plastic article by the blow molding of an injection molded preform free of waste and free from structural defects caused by earlier proposed injection molding techniques.

It is a further object of this invention to provide an improved method for the manufacture of a plastic article by injection molding a blank or preform in an injection mold cavity substantially one dimension of which is defined by a pressure-producing element, removing the preform from the injection mold cavity and promptly blowing the preform without reheating to a final configuration conforming to that of an enclosing blow mold.

Yet another important object of this invention is the provision of the method of making a plastic article by providing an injection mold cavity having one open side, simultaneously filling the injection mold cavity with plasticized material through the open side of the mold, closing the open side of the mold to subject the plasticized material to injection molding pressures, and then removing the injection molded preform from the cavity and promptly inflating the same to its final configuration.

Other objects of this invention will appear in the following description and appended claims, reference being had to the accompanying drawings forming a part of this specification wherein like reference characters designate corresponding parts in the several views.

On the drawings:

FIGURE 1 is a vertical sectional view of an injection molding apparatus capable of carrying out the initial injection molding step of the process of the present invention;

FIGURE 2 is a view similar to FIGURE 1 illustrating the apparatus during the injection molding of the preform;

FIGURE 3 is a vertical sectional view illustrating the apparatus positioned to carry out the blowing of the preform to the configuration of the final article;

FIGURE 4 is a vertical sectional view illustrating the manner in which plastic material is supplied to the injection molding cavity;

FIGURES 5, 6 and 7 are similar to FIGURES 1, 2 and 3, and illustrate another modified form of apparatus wherein the blowing step is carried out by a blow head separate from the injection molding apparatus.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

*The embodiment of FIGURES 1 through 4*

In FIGURES 1 through 4, there is shown one form of apparatus for carrying out the method of the present invention and including an injection molding apparatus indicated generally at 20. The apparatus illustrated in FIGURES 1 through 4 of the drawings is shown as particularly adapted to the manufacture of bottles or containers having neck or "finish" portions which are exteriorly peripherally threaded. It will be appreciated that the apparatus and methods herein disclosed are well adapted to the manufacture of other articles and that the specific showing of containers is merely exemplary.

More specifically, the injection molding apparatus 20 includes a centrally located blank mold 21 having a central cylindrical mold cavity 22. The mold 21 is preferably oriented so that the axis of the cylindrical cavity 22 extends vertically, although, if desired, the axis of the cavity may be oriented horizontally. The central blank mold 21 is provided with an upper recess 23 concentric with the axial bore 22 and snugly receiving therein a lower embossed portion 24 of an upper neck of "finish" mold 25 comprising transversely separable mold segments 26. The utilization of such mold segments and various actuating means for separating the same transversely are well known in the art and need not be described in detail herein.

The mold segments 26 each carry internal blocks 27 movable transversely therewith and defining at their lower ends the upper extremities of a generally cylindrical neck mold cavity 28 cooperably defined by semi-cylindrical recesses in the abutting faces of the mold segments. When closed, the segments 26 are aligned with the body mold 21, so that the bore 22 cooperates with the neck mold cavity 28 to define the complete exterior periphery of the desired preform.

The interior periphery of the mold cavity is defined by a tube 30 projecting axially into the neck mold cavity 28 and the bore 22 with the cylindrical periphery 31 thereof being spaced peripherally from the cavity 28 and the bore 22 to define a complete mold cavity, as indicated generally by reference numeral 33. The lower axial extremity of the tube 30 is internally chamfered, as at 34, to define a valve seal against which is seated a blow valve element, indicated generally at 35 and having a lower enlarged head 36, the frusto-conical exterior periphery of which cooperates with the chamfered valve seat 34 to control the flow of air, in a manner and for a purpose to be hereinafter more fully described, through an annular flow passage 37 defined between the valve element 35 and the inner periphery 38 of the tube 30.

Located in axial alignment with the mold cavity 33 and underlying the mold block 21 is a material supply block, indicated generally at 40, and having an axial passage 41 therein axially aligned with the mold cavity 33. The supply block passage 41 carries a liner 42 which is annular in cross-sectional configuration having an internal bore 43 defined by a tubular body 44 and an upper radially enlarged head 45 covering the joint between the supply block 40 and the mold block 21. More particularly, the radially enlarged head 45 is snugly seated within a recess 46 in the lower portion of the mold block 21. In addition to bridging the gap between the mold block 21 and the supply block 40, the enlarged head 45 defines the extreme lower portion of the mold cavity 33 by the provision of curved inner corners 47, thereby preventing the necessity of milling or otherwise forming these smoothly contoured corners in a relatively inaccessible portion of the mold block 21.

Reciprocable within the supply block 40 is a vertically movable injection piston 50. The piston 50, of course, fits snugly within the supply block bore 43 and has an upper, planar, circular face 51 formed at the end of a piston head 52 joined to and movable with an actuating rod 53 movable by a suitable source of power, such as a fluid actuated cylinder (not shown).

Plastic material is supplied to the supply block bore 43 through a transverse supply passage 55 within which a reciprocable supply piston 56 operates. As best illustrated in FIGURE 4 of the drawings, this transverse supply passage 55 communicates through a vertical port 57 with a transverse supply passage 58 adapted to receive plasticized material 60 from a suitable source, such as a screw-type plasticizer indicated generally at 61. Preferably, the supply passage 58 is transversely branched, as through sleeve 62, to supply the plasticized material 60 to the vertical port 57 through opposing lateral ports 58. Material is displaced through the port 57 and into the supply passage 55 by means of a vertically reciprocable supply piston 63 actuated by a lower fluid pressure cylinder 64. The upper face 65 of the piston 63 is arcuate to blend smoothly with the contour of the supply passage 55.

So far as the supplying of the material 60 to the mold cavity is concerned, it will be readily appreciated that material supplied under the pressure of the plasticizer 61 through the passage 58 enters the vertical port 57 and is displaced upwardly within the port into the upper passage 55. Material in the passage 55 is then displaced transversely by the feed piston 56 into the passage 43 to be displaced therefrom into the mold cavity 33 upon upward movement of the injection piston 50.

After the plasticized material 60 has been supplied to the lower supply chamber 43 by operation of the supply piston 56, the injection piston 50 is advanced through the supply chamber 43, picking up the plastic material from the supply piston 56 and displacing the material upwardly into the injection mold cavity 33.

The injection molding step is well illustrated in FIGURE 2 of the drawings from which it will be seen that substantially one complete dimension of the injection mold space is defined by the face 51 of the piston 50 and the material within the injection mold space is not connected to any source of plasticized material or to any pressure source by any restricted orifice or the like.

Appropriate thermal control elements, such as coolant circulation passages or even electric resistance heaters, may be provided in the mold block 21, the neck mold 26, the tube 30 and/or the piston 50 to provide for the thermal control of the plasticized material within the mold space 33 without undue or harmful differences in cooling rate between various portions of the injection molded article.

Thus, the injection molded article is formed without any thermal or structural weaknesses inherent in cooling at largely different rates of those weaknesses effected by the juncture of the mold with a pressure or plastic source through a restricted orifice, as in conventional high pressure injection molding procedures. Further, the utilization of the multi-part mold including the insert tube 30, the piston 50, the corner-defining sleeve 42, the body mold 21 and the neck mold 25 accommodates the formation of injection molded preforms or blanks of complicated shape without interfering with the molding of such preforms at relatively low pressures and also accommodates the thermal control of the plasticized material forming the preform without substantial thermal differentials thereacross.

Following the formation of the preform as illustrated in FIGURE 2 of the drawings, the injection molded preform is removed from the body mold 21, such removal being effected without removal of the blow tube 30 and without removal of the composite neck mold 25. Such removal of the injection molded preform may be accomplished by axially upwardly withdrawing the assembly of the preform, neck mold and blow tube. Alternatively, a segmental body mold 20 may be provided, the body mold segments then being laterally separable to more readily accommodate removal of the injection molded preform.

In any event, the preform is removed, preferably vertically, from the body mold 21 and the body portion of the mold is enclosed in a pair of separable blow mold segments 70, these blow mold segments having abutting vertical faces 71 and interior cavity-defining surfaces 72 which cooperatively define the final configuration of the blow portion of the article.

In the manufacture of containers or similar articles wherein an injection molded portion of the final article is preferred, which portion is not blown to its final shape, the blow mold segments 70 are closed upon only that portion of the preform which is to be blown to its final configuration, the remainder of the article preferably being enclosed within the equivalent part of the injection mold until after the blowing step has been accomplished. Further, it will be noted that the height of the injection molded preform is less than the height of the final article and less than the height of the blow mold cavity 72. Thus, closure of the blow mold segments 70 onto the preform does not pinch the preform and does not form any waste portion which must be subsequently severed therefrom.

In the utilization of the apparatus of FIGURE 3, the valve rod 35 is actuated vertically downwardly to open the valve port defined by the chamfered surfaces 34 and to accommodate the passage of blow air through the annular space 37 defined between the blow tube 30 and the valve rod 35 and hence between the rod head 36 and the chamfered valve seat surfaces 34. Air so introduced into the interior of the preform will readily inflate the preform against the mold cavity surfaces 72 so that the final blown portions of the article are formed. Due to the absence of structural or thermal weaknesses in the preform, there is no danger of the preform "blowing out" during introduction of air at blowing pressures of one hundred pounds per square inch or greater.

Following the blowing of the final article, the separable blow molds are opened. The separable blow mold segments 70 are laterally separated, and the segments 26 of the neck mold 25 are also laterally separated, so as to accommodate removal of the final blown article from the composite mold. Following such removal, the neck mold 25 is moved downwardly into engagement with the body mold 21 for the next injection molding step. The hereinbefore described cycle is then repeated.

The embodiment of FIGURES 5 through 7

In each of the three previously described embodiments of the invention, the blowing has been accomplished through a tubular element which forms a portion of the injection mold during the injection molding operation. Further, during the removal of the injection molded preform from the the injection mold and during the positioning of the preform in the blow mold, the preform is supported by the blow tube or the valve element associated therewith.

FIGURES 5 through 7 provide an apparatus which is a substantial departure from those previously described inasmuch as a separate blow head is utilized.

After formation of the injection molded preform 106, the preform is stripped from the main mold 21, the preform 106, if desired or necessary, being supported by either the mandrel 105 or the injection piston 50 or both. Following such removal, the mandrel 105 is moved axially from the preform, as best shown in FIGURE 6 of the drawings, with the preform 106 still being supported by the neck mold segments 26 and by the insert or collar 90. It will be noted that the collar 90 is provided with an inner, generally cylindrical extension 107 which projects downwardly into the injection molded neck or finished portion 108 of the preform to thereby form the inner periphery of the neck. Also, the extension 107 cooperates with the inner periphery of the neck mold segments 26 to confine the upper portions of the preform 106 therebetween, thereby making possible the support of the preform solely from the neck mold segments 26 and the collar 90 as best illustrated in FIGURE 6.

Following stripping of the preform, the lower portions 110 of the preform are enclosed in blow mold segments 70 and a blow head indicated generally at 111 is inserted into the collar 90. This blow head or blow tube 111 having an exterior diameter substantially less than the interior diameter of the collar 90. To seal the blow tube 110 within the collar 90, a resilient, preferably elastomeric annular seal ring 112 is carried by the blow tube 110 to surround a medial portion thereof. When this seal ring 112 is snugly interposed between and in sealing engagement with both the exterior periphery of the blow tube and interior periphery of the collar 90 following insertion of the blow tube, the preform can be blown to its final configuration. Of course, such blowing does not disturb the upper or neck portion of the final article inasmuch as such portions 108 are confined between the segmental neck mold 25 and the lower portions 107 of the collar 90.

Preferably, the blowing of the injection molded preform 106 by means of the separate blow head 110 is accomplished immediately after injection molding of the preform and prior to sufficient cooling of the preform for it to be set or hardened to such an extent that blowing is no longer possible. However, in the event that hardening does occur, the preform can be re-heated for the purpose of blowing without departing from the basic concepts of the present invention.

By utilization of a separate blow head, a greater degree of flexibility in the apparatus and the process can be obtained and the process may be better adapted to consecutive injection molding, stripping and blowing steps performed, for example, on a rotary table.

Summary

From the foregoing description of the several embodiments of applicant's invention, it will be seen that the method utilized is capable of substantial variation but that, in each instance, the formation of the preform is carried out by an injection molding procedure wherein the plasticized material from which the preform is to be made is completely confined at all its dimensions and is subjected to the substantial molding pressures developed by an injection piston. At the same time, the completely confined and injection molded preform is made without the necessity of forcing material through extremely restricted orifices and without the formation of minute joining portions or webs surrounded by massive heat extraction surfaces. In other words, the injection molding step of the process is carried out without inducing into the injection molded preform those structural and/or thermal weaknesses inherent in all previously utilized injection molding processes.

By thus injection molding the preform in a mold wherein substantially one entire transverse dimension thereof is utilized for the introduction of material into the injection mold and upon which the injection molding pressure is applied over a substantial area of the injection molded preform, a preform of improved structural and thermal characteristics is obtained. These characteristics of the preform are utilized to excellent effect during a subsequent blowing operation inasmuch as the preform will not "blow out," even upon the subjection of the preform to blowing pressures of one hundred pounds per square inch or greater, and the rapid blowing at such high pressures is rendered effective for the first time as applied to an injection molded preform.

By utilizing the comparatively large area piston or injection ram and injection molding at comparatively low presures, another disadvantage of the normal high pressure injection molding technique is avoided. As the plasticized material cools in the injection mold, thermal shrinkage occurs and high pressure injection compacts the solidifying material as such shrinkage occurs. By the use of low pressures, as heren proposed, such compaction is avoided and a material saving of about 5% of the article weight is obtained.

Further, and even more importantly, this improved injection molded preform, and its highly desirable and novel characteristics, is evident in the final blown article inasmuch as the finished article can be only as good as the preform from which it is made. By such injection molding, complicated preforms of tapered configuration, of substantially differing wall thicknesses and of widely variant shape can be injection molded, whereas such preforms could not be extruded. Further, the final article possesses the full isotropic characteristics of the plastic material from which it is formed, and the final article is free of structural weaknesses and thermally induced stress concentrations. The resultant vastly improved articles could not be obtained by any previously known or conventional process for injection molding a preform.

I claim:

1. In a method of making a blown plastic container by blowing a preform, the steps of superimposing an annular finish mold over a main injection mold having open upper and lower ends; inserting a central mandrel through the finish mold and into the main mold; introducing plasticized material through the open lower end of the mold to fill the cavity defined between the mandrel, the finish mold and the main mold; closing the mold lower end with a pressure element to define a preform bottom between the pressure element and the mandrel; concurrently moving the preform and the finish mold axially relative to the main mold; closing the sections of a blow mold about the preform portions exposed beyond the finish mold; and introducing blow air into the preform.

2. In a method of making a blown plastic container by blowing a preform, the steps of superimposing an annular finish mold over a main injection mold having an open-ended cavity; inserting a central blow tube through the finish mold and into the main mold, the blow tube exterior periphery cooperating with the finish mold to define therebetween a finish cavity; introducing plasticized material through the open bottom of the main mold cavity to fill the composite cavity defined between the blow tube, the finish mold and the main mold; closing the main mold bottom opening with a pressure element to define a closed preform bottom between the pressure element and the blow tube; removing the molded preform from the main mold by concurrent movement of the preform, the finish mold and the blow tube relative to the main mold and the pressure element; closing the sections of a blow mold about the preform portions exposed beyond the finish mold; and introducing blow air into the preform through the blow tube.

3. In a method of making a blown plastic article from an injection molded preform, the steps of aligning a mass of plasticized plastic material with a preform mold cavity having one side thereof open and a blow pin aligned with said open side and terminating in spaced relation thereto, introducing the mass into the mold through the open side thereof to encase said blow pin, positioning a pressure element to close the open side of the mold and concurrently subjecting the mass in the mold to an injection pressure from the pressure element, thereby defining one wall of the preform between said element and said blow pin, stripping the resultant molded preform from the mold, and finally blowing the preform by fluid introduced through said blow pin.

4. A method of making a plastic article comprising the steps of introducing plasticized material into a mold cavity through an inlet opening constituting substantially one complete dimension of the mold cavity, the material so introduced contacting a valving element spaced from said opening and defining a portion of the mold, closing the opening by a pressure-generating element by means of which the material is subjected to a molding pressure, the material interposed between said valving element and said pressure-generating element defining a wall of the molded preform, positioning the preform in a blow mold cavity, and blowing the preform to a final configuration by fluid introduced thereinto through said valving element.

5. In a method of making a blown plastic article from an injection molded preform, the steps of aligning a mass of plasticized plastic material with a preform mold cavity having one open side thereof, corresponding to substantially one complete dimension of the preform, positioning a blow pin interiorly of said cavity and with one end spaced from said opening, displacing the mass into the mold through the open side thereof by a pressure element to invest the one end of said blow pin, closing the open side of the mold with said element in spaced relation to said one end of said blow pin while subjecting the mass in the mold to an injection pressure, thereby injection molding a preform having an end wall defined by material interposed between said blow pin and said element, positioning the resultant injection molded preform in a blow mold cavity by displacing the preform in the direction of displacement of the plasticized mass into the mold, and finally blowing the preform by fluid introduced thereinto through said blow pin.

6. In a method of making a plastic article by blowing a cup-shaped injection molded preform to a final configuration, the improvements of filling an injection mold with plasticized material introduced thereinto about a central blow pin through a completely open end wall of said injection mold registering with the end of the blow pin, simultaneously closing the previously open end wall and subjecting material isolated thereby in the injection mold to an injection molding pressure to form a preform encasing the end of the blow pin, opening the injection mold, jointly removing the injection molded preform and the blow pin from the injection mold, transferring the preform still encasing the blow pin to a blow mold, and blowing the preform by fluid introduced thereinto through the encased blow pin.

No references cited.